Feb. 3, 1959  A. O. SWAN  2,871,539
EXTRUDED FASTENER
Filed May 22, 1956
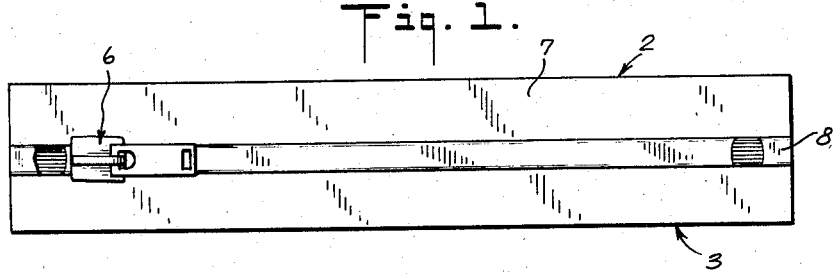
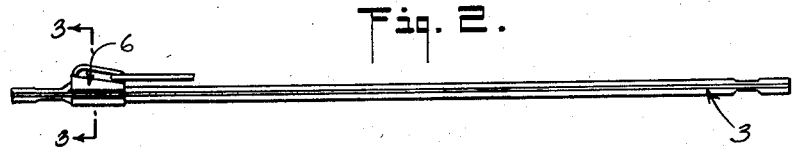
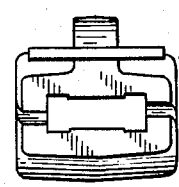
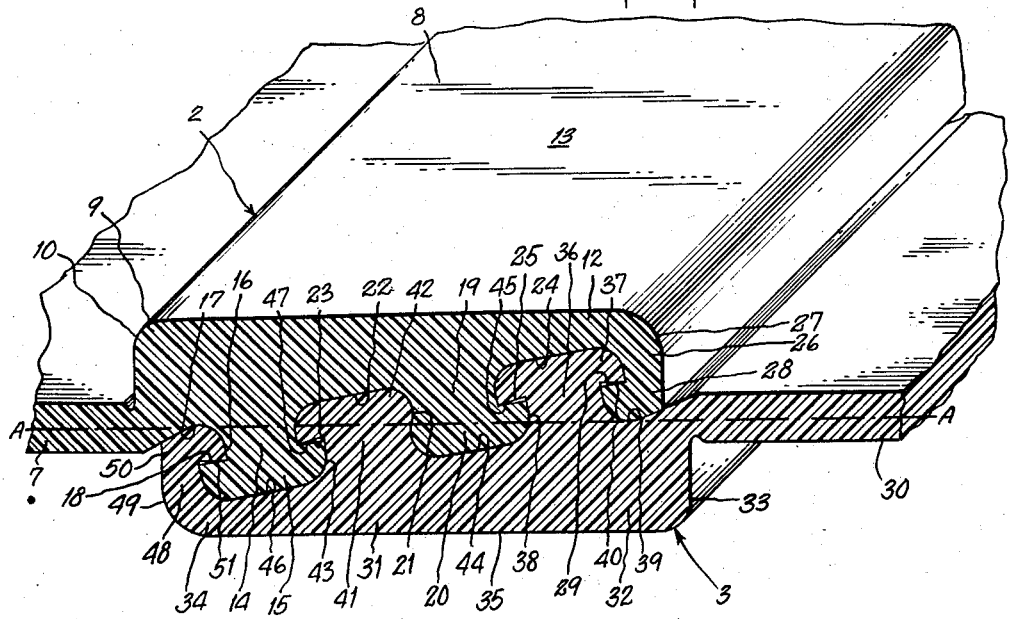
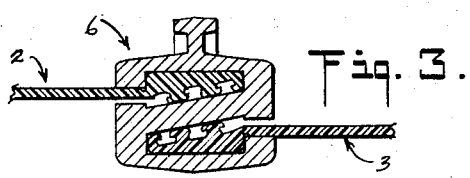
INVENTOR.
ALLAN O. SWAN
BY R. E. Meech
ATTORNEY United States Patent Office 2,871,539
Patented Feb. 3, 1959

2,871,539

EXTRUDED FASTENER

Allan O. Swan, Conneaut Lake, Pa., assignor to Talon, Inc., a corporation of Pennsylvania Application May 22, 1956, Serial No. 586,572

6 Claims. (Cl. 24—201)

This invention relates to fastening devices of the type comprising two strips of a plastic material, each of which is provided with a web portion and a marginal portion having a plurality of grooves and ridges extending longitudinally of each of the strips which are adapted to interlock with one another.

While various attempts have been made to provide a satisfactory fastener of such construction, such fasteners were not entirely satisfactory for various reasons. In the first place, the construction of the interlocking means carried by the marginal portions of the strip was such that the two strips had a tendency to become disengaged when flexed or bent lengthwise or when subjected to any reasonable lateral pulling force on the sides of the strips thereby defeating the intended purpose of the fastener. Under such bending or flexing action, a pressure is exerted in a direction normal to the planes of the strips tending to separate the two components by forcing the ridges out of engagement with the grooves.

Also, in such fasteners, the free edge along the outer edges of the marginal portions of the strips were not confined and the strip could be easily disengaged merely by forcing a sharp object such as a fingernail in under these free edges thereby easily disengaging the strips. Thus, it will be seen that if these free edges would become accidentally caught on a sharp object when in use the fastener will be unintentionally opened which of course is a disadvantage and troublesome.

All previous constructions of this type usually featured a relatively uniform wall section in all portions of the cross section of the gripping elements of the marginal portions. The resulting displacement of the gripping ridges adjacent the web portions introduced a serious deformation of these gripping ridges when the fastener was subjected to lateral forces tending to pull the fastener strips apart which was highly objectionable.

It is the general object of the present invention to provide an improved fastening device construction of the so-called continuous or extruded type in which the above mentioned disadvantages are eliminated and wherein the marginal portions together with the ridges and grooves carried thereby are proportioned and arranged in such a manner that a firm interlocking frictional engagement therebetween is obtained as a result of any action of forces tending to separate the two components when subjected to bending and flexing and which efficiently and effectively counteracts such tendency.

It is a more specific object of this invention to provide a fastener of this type wherein each of the marginal portions is tapered outwardly so as to provide a relatively thick or heavy portion adjacent the web portion and a relatively thin or light portion at the extreme outer edge of the marginal portion which results that the thin portion will tend to follow the distortion of the heavier section of the opposed strip when the fastener is flexed without itself being deformed to the point of becoming disengaged therefrom.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 1 is a plan view of a fastening device constructed in accordance with the present invention having a slider mounted thereon, Fig. 2 is a side view of the fastener as shown in Fig. 1, Fig. 3 is a sectional view taken on line 3—3 of Fig. 2, Fig. 4 is a perspective view of the improved fastening device of my invention, and Fig. 5 is an end view of the slider.

Referring more particularly to the drawings, there is shown in Figs. 1 and 2, the improved fastening device of the present invention which comprises a pair of elongated identical strips 2 and 3 having longitudinally extending marginal interlocking portions. There is arranged on these marginal interlocking portions, preferably a slider 6, for longitudinal movement therealong for engaging and disengaging these marginal interlocking portions in a well known manner.

As more clearly shown in Figs. 3 and 4, the strips 2 and 3 are preferably formed by extrusion from a suitable plastic resinous material, such as one of the vinyls, polyethylene and the like, which have some degree of elasticity. The strip 2 has a flat, relatively thin web portion 7 and a marginal portion 8 which is substantially thicker than the web portion.

This marginal portion 8 has a relatively thick inner portion 9 which is disposed to one side of the web portion 7 and directly next thereto so as to provide a shoulder 10 extending longitudinally therealong, and a relatively thin outer edge portion 12. That is to say, the marginal portion tapers outwardly from a relatively thick inner portion to a relatively thin outer portion.

The outer surface of this marginal portion 8 is substantially flat, as at 13, and there is arranged on the inner side thereof, a longitudinally extending, solid rib-like projecting portion 14 which is disposed at the relatively thick inner portion 9 adjacent the inner side of the marginal portion and the web portion 7. This rib-like portion 14 has an enlarged head portion 15 so as to provide a constricted neck portion 16. On the inner side of this rib-like portion 14, there is arranged preferably a longitudinally extending channel 17 which is positioned adjacent the web portion 7 at the inner edge of the marginal portion 8. The head portion 15 of the rib-like portion 14 is undercut on one side so as to provide a plane surface 18 which overhangs the channel 17.

There is also arranged on the inner side of the marginal portion 8, an intermediate longitudinally extending, solid rib-like projecting portion 19 having an enlarged head portion 20 so as to provide a constricted neck portion 21. Between the inner rib-like portion 14 and this intermediate rib-like portion 19, there is arranged a longitudinally extending channel 22. The outer side of the head portion 15 of the rib-like portion 14 is also undercut so as to provide a plane surface 23 which overhangs this channel 22. Outwardly of the rib-like portion 19, there is arranged a longitudinally extending channel 24. The outer side of the head portion 20 of the rib-like portion 19 is undercut so as to provide a plane surface 25 which overhangs this channel 24.

At the extreme outer edge of the marginal portion 8, there is arranged a longitudinally extending, solid rib-like projecting portion 26 so as to provide an outer shoulder 27 extending longitudinally along the outer edge of the marginal portion. This outer rib-like portion 26 has a head portion 28 which is undercut so as to provide a plane surface 29 which overhangs the channel 24. Thus, it will be seen that this rib-like portion 26 is substantially hook-shaped in cross section.

The strip 3 is identical with the strip 2 and has a web portion 30 and a marginal portion 31. This marginal portion has a relatively thick inner portion 32 which is disposed to one side of the web portion 30 and directly next thereto so as to provide a shoulder 33 extending longitudinally therealong, and a relatively thin outer edge portion 34. That is to say, this marginal portion 31 as before, tapers outwardly from a relatively thick inner portion to a relatively thin outer portion.

The outer surface of this marginal portion 31 likewise is substantially flat, as at 35, and there is arranged on the inner side thereof, a longitudinally extending, solid rib-like projecting portion 36 which is disposed at the relatively thick inner portion 32 adjacent the inner side of the marginal portion and the web portion 30. This rib-like portion 36 has an enlarged head portion 37 so as to provide a constricted neck portion 38. On the inner side of this rib-like portion 36, there is arranged, preferably, a longitudinally extending channel 39 which is positioned adjacent the web portion 30 at the inner edge of the marginal portion 31. The head portion 37 of this rib-like portion 36 is undercut on one side so as to provide a plane surface 40 which overhangs the channel 39 and is positioned directly opposite the plane surface 29 of the opposed strip with which it co-operates.

There is also arranged on the inner side of this marginal portion 3, an intermediate longitudinally extending, solid rib-like projecting portion 41 having an enlarged head portion 42 so as to provide a constricted neck portion 43. Between the inner rib-like portion 36 and this intermediate rib-like portion 41, there is arranged a longitudinally extending channel 44. The outer side of the head portion 37 of the rib-like portion 36 is also undercut so as to provide a plane surface 45 which overhangs this channel 44 and is positioned directly opposite the plane surface 25 of the opposed strip with which it co-operates. Outwardly of the rib-like portion 41, there is arranged a longitudinally extending channel 46. The outer side of the head portion 42 of the rib-like portion 41 is undercut so as to provide a plane surface 47 which overhangs this channel 46 and is positioned directly opposite the plane surface 23 of the opposed strip with which it co-operates.

Likewise at the extreme outer edge of the marginal portion 31, there is arranged a longitudinally extending, solid rib-like projecting portion 48 so as to provide an outer shoulder 49 extending longitudinally along the outer edge of the marginal portion. This outer rib-like portion 48 has a head portion 50 which is undercut so as to provide a plane surface 51 which overhangs the channel 46, and is positioned directly opposite the plane surface 18 of the opposed strip with which it likewise co-operates. Thus, it will be seen that this rib-like portion 48 also is substantially hook-shaped in cross section.

The projections and channels of the respective strips are substantially identical in cross section so that the projections of one strip will fit into and engage with the channels of the other strip when the marginal edges of the strip are interlocked and the fastener is closed.

All of the rib-like projecting portions 14, 19, 26 and 36, 41, 48 are disposed at an obtuse angle to center line or planes of their respective web portions 7 and 30. That is, the depth and height of the rib-like portions and channels are arranged at an obtuse angle to the planes of the respective strips. It will be noted that the plane surfaces 18, 23, 25, 29 and 40, 45, 47, 51 are arranged substantially in alignment with each other on their respective marginal portions 7 and 30. These plane surfaces also are arranged angularly relative to the web portions but are disposed substantially perpendicular to the rib-like portions and channels.

When the fastener strips 2 and 3 are engaged and interlocked with one another, as more clearly shown in Figs. 3 and 4, it will be seen that the rib-like portions 14, 19 and 26 of the strip 2 will be disposed in the corresponding channels 46, 44, and 39 of the strip 3 and that the rib-like portions 36, 41 and 48 of the latter strip will be disposed in the corresponding channels 24, 22 and 17 of the strip 2 in interlocked relation. It will be understood that the dimensions of the projections and channels are such that when the interlocking portions of the strips are nested, sufficient clearance is provided to enable lengthwise flexing of the interlocked strips without any danger of separation thereof.

It will be noted that when the strips 2 and 3 are interengaged, as shown more clearly in Figs. 3 and 4, the web portions 7 and 30 thereof are substantially in the same plane and that the median plane of these web portions passes substantially through both the intermediate rib-like portions 19 and 41 of the marginal portions. That is to say, the center or median line, as designated by the broken line A—A, of both web portions 7 and 30, of the respective strips 2 and 3 passes substantially through the center of the head portions 20 and 42 of the respective rib-like portions 19 and 41. It will also be seen that the center or median line A—A is disposed to one side of both the relatively thick inner portions and relatively thin outer portions of the respective marginal portions of the respective strips. It will be seen further that the head portions 15 and 50 of the marginal portions are disposed on one side of this center line A—A while the head portions 28 and 37 are disposed on the opposite side thereof.

One important aspect of the present invention is that there is provided in the marginal interlocking portion of each of the strips, a relatively heavy or thick inner portion disposed directly next to the web portion with the hook-shaped rib-like portion at the outer edge of each of the marginal portions being positive to and disposed on an angle to the heavy section. By providing such a construction, extremely little deformation of this rib-like portion results adjacent the web portions when the fastener and strips are subjected to laterally applied forces tending to pull the strips apart thereby greatly enhancing the crosswise strength of the fastener.

Also, this heavy or thick section with the inner rib-like portion carried thereby adjacent the web portion is engaged by a relatively light or thin section of the opposed strip. This is important for the reason that when the fastener is flexed or bent, this thin section will have a tendency to adhere to and follow the distortion or contour of the heavier section of the opposed strip without itself being deformed to the point of disengagement from the inner rib-like portion of the heavy or thick section.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A fastening device of the class described comprising a pair of opposed elongated strips of flexible material, each of said strips having a web portion and a thickened marginal portion, said marginal portions overlapping one another and being substantially identical in cross section, each of said marginal portions having a relatively thick inner portion disposed directly next to their respective web portions and a relatively thin outer edge portion, each of said marginal portions having three spaced-apart, substantially parallel, longitudinally extending rib-like portions and three longitudinally extending channels arranged therealong, the depth and axis of said channels and rib-like portions being arranged angularly relative to the plane of their respective web portions, each of said rib-like portions having a head portion and a constricted neck portion, the cross section of said channels corresponding to the cross section of the respective rib-like portions, each of said rib like portions having a plane surface overhanging an adjacent channel, all of said plane surfaces being arranged substantially in alignment with each other and arranged angularly to the planes of the web portions but substantially perpendicular to said rib-like portions and said channels, the outermost rib-like portion of each marginal portion being substantially hook-shaped with the head portion thereof disposed in a channel arranged adjacent the web portion of the opposed marginal portion.

2. A fastening device, as defined in claim 1, wherein the median plane of each of the web portions are substantially in alignment with one another and disposed to one side of both the relatively inner thick and relatively thin outer edge portions of their respective marginal portions and passing substantially through the center of the intermediate rib-like portions of each of the marginal portions.

3. A fastening device of the class described comprising a pair of opposed elongated strips of flexible material, each of said strips having a web portion and a thickened marginal portion, said marginal portions overlapping one another and being substantially identical in cross section, each of said marginal portions having three spaced-apart, substantially parallel, longitudinally extending, rib-like portions and a pair of longitudinally extending channels arranged therealong, the depth and height axis of said channels and rib-like portions being arranged angularly relative to the plane of their respective web portions, the outer rib-like portion of each marginal portion having an inwardly extending projecting portion providing substantially a plane surface overhanging the adjacent channel on the same marginal portion, the intermediate rib-like portion of each marginal portion having an outwardly projecting portion disposed directly opposite said last mentioned projecting portion providing substantially a plane surface overhanging the same channel on the same marginal portion, the innermost rib-like portion of each marginal portion having a projecting portion arranged to either side thereof providing substantially a plane surface to either side thereof overhanging the respective adjacent channels of the same marginal portion which plane surfaces are disposed directly opposite and adapted to co-operate with the plane surfaces of the projecting portions of said outer and intermediate rib-like portions, all of said plane surfaces being arranged substantially in alignment with each other and arranged angularly to the planes of the web portions but substantially perpendicular to said rib-like portions and said channels.

4. A fastening device of the class described comprising a pair of opposed elongated strips of flexible material, each of said strips having a web portion and a thickened marginal portion, said marginal portions overlapping one another and being substantially identical in cross section, each of said marginal portions having a relatively thick inner portion disposed directly next to their respective web portions and a relatively thin outer edge portion, each of said marginal portions having three spaced-apart, substantially parallel, longitudinally extending, rib-like portions and at least a pair of longitudinally extending channels arranged therealong, the depth and height axis of said channels and rib-like portions being arranged angularly relative to the plane of their respective web portions, each of said rib-like portions having a head portion and a constricted neck portion, the cross section of each of said channels corresponding to the cross section of said rib-like portions, the median plane of each of said web portions being substantially in alignment with each other and passing substantially through the center of the intermediate rib-like portion of each of said marginal portions, the head portion on the innermost rib-like portion on one of the marginal portions and the outermost rib-like portion on the other marginal portion being disposed on one side of the median plane of said web portions with the head portion on the innermost rib-like portion of the other marginal portion and the outermost rib-like portion of the opposed marginal portion being disposed on the opposite side of the median plane of the web portions.

5. A fastening device of the class described comprising a pair of opposed elongated strips of flexible material, each of said strips having a web portion and a thickened marginal portion, said marginal portions overlapping one another and being substantially identical in cross section, each of said marginal portions having a relatively thick inner portion disposed directly next to their respective web portions and extending to one side thereof so as to provide a longitudinally extending shoulder therealong, and a relatively thin outer edge portion providing a longitudinally extending shoulder therealong, each of said marginal portions having three spaced-apart, substantially parallel, longitudinally extending, rib-like portions and a pair of longitudinally extending channels arranged therealong, the depth and height axis of said channels and rib-like portions being arranged angularly relative to the plane of their respective web portions, the outer rib-like portion arranged along the relatively thin edge portion of each marginal portion having an inwardly extending projecting portion providing substantially a plane surface overhanging the adjacent channel on the same marginal portion, the intermediate rib-like portion of each marginal portion having an outwardly projecting portion disposed directly opposite said last mentioned projecting portion providing substantially a plane surface overhanging the same channel on the same marginal portion, the innermost rib-like portion arranged along the relatively thick portion of each marginal portion having a projecting portion arranged to either side thereof providing substantially a plane surface to either side thereof overhanging the respective adjacent channels of the same marginal portion which plane surfaces are disposed directly opposite and adapted to co-operate with the plane surfaces of the projecting portions of said outer and intermediate rib-like portions, all of said plane surfaces being arranged substantially in alignment with each other and arranged angularly to the planes of the web portions but substantially perpendicular to said rib-like portions and said channels.

6. A fastening device, as defined in claim 5, wherein the median plane of each of the web portions are substantially in alignment with one another and disposed to one side of both the relatively inner thick and relatively thin outer edge portions of their respective marginal portions and passing substantially through the center of the intermediate rib-like portions of each of the marginal portions.

References Cited in the file of this patent

UNITED STATES PATENTS

| | | |
|---|---|---|
| 2,558,367 | Madsen | June 26, 1951 |
| 2,637,085 | Madsen | May 5, 1953 |
| 2,658,250 | Koutnik | Nov. 10, 1953 |

FOREIGN PATENTS

| | | |
|---|---|---|
| 287,845 | Switzerland | Apr. 16, 1953 |
| 1,097,218 | France | July 1, 1955 |